United States Patent
Kumar et al.

(10) Patent No.: US 12,539,870 B2
(45) Date of Patent: Feb. 3, 2026

(54) FATIGUE DETECTION AND OPERATOR ALERT SYSTEM

(71) Applicant: Caterpillar Inc., Peoria, IL (US)

(72) Inventors: Luvkush Kumar, Mathura (IN); Tarashankar Mukherjee, Chinsurah (IN); Robert A. Hamann, Tucson, AZ (US); Jeffrey P. Labre, Oro Valley, AZ (US)

(73) Assignee: Caterpillar Inc., Peoria, IL (US)

( * ) Notice: Subject to any disclaimer, the term of this patent is extended or adjusted under 35 U.S.C. 154(b) by 219 days.

(21) Appl. No.: 18/209,352

(22) Filed: Jun. 13, 2023

(65) Prior Publication Data

US 2024/0416940 A1    Dec. 19, 2024

(51) Int. Cl.
*B60W 50/14* (2020.01)
*B60W 40/08* (2012.01)
*G06V 20/59* (2022.01)

(52) U.S. Cl.
CPC ............ *B60W 50/14* (2013.01); *B60W 40/08* (2013.01); *G06V 20/597* (2022.01);
(Continued)

(58) Field of Classification Search
CPC .......... A61B 5/18; B60K 28/066; B60N 2/38; B60Q 9/008; B60W 30/08; B60W 40/08;
(Continued)

(56) References Cited

U.S. PATENT DOCUMENTS 6,201,568 B1 * 3/2001 Watkins ................. B60N 2/879
348/148
6,927,694 B1 * 8/2005 Smith .................. B60K 28/066
340/576
(Continued)

FOREIGN PATENT DOCUMENTS

CN          102610057 B        8/2016
CN          112477794 A    *   3/2021   ....... B60R 21/01538
(Continued)

OTHER PUBLICATIONS

Written Opinion and International Search Report for Int'l. Patent Appln. No. PCT/US2024/029636, mailed Sep. 5, 2024 (13 pgs).

*Primary Examiner* — Stephen R Burgdorf

(57) ABSTRACT

A fatigue detection and operator alert system is disclosed for detecting operator fatigue in a machine having a cab, a seat, and a joystick. The fatigue detection and operator alert system comprises an optic sensor positioned non-obstructively facing an operator and configured to output a first signal consisting of images captured of an operator; a pressure sensor configured to provide a second signal indicative of a pressure of an operator hand on the joystick; a thermal sensor configured to provide a third signal indicative of a temperature of the operator; a load sensor configured to provide a fourth signal indicative of a load of an operator foot; and a controller configured to: receive the sensor signals; detect instances of operator fatigue based on the received sensor signals during non-hauling operation; and
(Continued)

actuate an alert device to alert the operator when instances of operator fatigue are detected.

20 Claims, 5 Drawing Sheets

(52) U.S. Cl.
CPC . *B60W 2420/403* (2013.01); *B60W 2540/221* (2020.02); *B60W 2540/229* (2020.02); *B60W 2540/26* (2013.01)

(58) Field of Classification Search
CPC .......... B60W 50/14; B60W 2420/403; B60W 2540/221; B60W 2540/26; E02F 9/205; E02F 9/2004; E02F 9/26; G05B 15/02; G06F 21/32; G06V 20/597; G07C 5/02; G07C 5/085; G08B 21/06; G08B 29/20; G09B 5/02
USPC ..................................................... 340/425.5
See application file for complete search history.

(56) References Cited

U.S. PATENT DOCUMENTS

| | | | |
|---|---|---|---|
| 8,604,932 B2 | 12/2013 | Breed et al. | |
| 9,402,577 B2 | 8/2016 | Ko et al. | |
| 11,186,964 B2 * | 11/2021 | Tomita | E02F 5/145 |
| 2006/0180379 A1 * | 8/2006 | Ferrone | B60K 28/066 340/576 |
| 2006/0284839 A1 * | 12/2006 | Breed | B60W 50/16 345/156 |
| 2007/0000709 A1 | 1/2007 | Danger et al. | |
| 2008/0266552 A1 * | 10/2008 | Malawey | A61B 5/18 340/576 |
| 2015/0015400 A1 | 1/2015 | Davis et al. | |
| 2015/0266484 A1 * | 9/2015 | Moran | B60W 40/08 340/576 |
| 2017/0071525 A1 | 3/2017 | Lin et al. | |
| 2017/0297581 A1 | 10/2017 | Hatfield et al. | |
| 2020/0080851 A1 | 3/2020 | Edwards et al. | |
| 2021/0150237 A1 * | 5/2021 | Woo | B60R 11/04 |
| 2021/0188289 A1 | 6/2021 | Oba | |
| 2021/0357670 A1 * | 11/2021 | Wu | G06T 7/70 |
| 2022/0090362 A1 * | 3/2022 | Yamashita | B60N 2/0027 |

FOREIGN PATENT DOCUMENTS

| | | | | |
|---|---|---|---|---|
| CN | 215581434 U | * | 1/2022 | ............... B60R 1/00 |
| DE | 102021110990 A1 | * | 6/2022 | ............. G08B 21/06 |
| EP | 3683623 B1 | | 9/2021 | |

* cited by examiner

FATIGUE DETECTION AND OPERATOR ALERT SYSTEM

TECHNICAL FIELD

The present disclosure generally relates to fatigue detection systems, and more particularly relates to a fatigue detection system for a non-hauling machine.

BACKGROUND

Operations such as excavating and mining are carried out for extended periods of time in harsh environmental conditions. Further, these operations are conducted using machines such as excavators and draglines operated by human operators. The operators must be alert during operation of the machines. In many cases, owing to long and rigorous working hours, it has been observed that the operators experience fatigue. For purposes of this disclosure, "fatigue" may be regarded as being inclusive of at least one or more of drowsiness, tiredness, sleepiness, weariness, exhaustion, weakness, lethargic, or a general decrease in awareness or alertness. Operator fatigue may cause reduced agility in operating the machine, which in turn may lead to reduced machine productivity, increased costs, and potential risk to the operator's safety besides machine safety.

More specifically, fatigue may delay the response time of the operators to dynamically changing external conditions at a work site. If fatigue causes an operator to doze off while operating the machine, the operator may subsequently lack any awareness as to whether they have fallen asleep, even if the sleep persisted for short or intermittent periods of time while operating the machine. Detection of operator fatigue when the operator operates the machine may be beneficial to promoting operational efficiency, machine productivity, and safety.

A variety of systems are well known in the art for detecting operator fatigue. However, these systems are well suited to machines such as haulers e.g., trucks, passenger vehicles, and other types of mobile machines but not machines (for sake of clarity, hereinafter referred to "non-hauling machines") that spend a large portion of their time at a fixed location yet are operational such as loaders e.g., excavators, draglines, and other types of non-hauling machines. In operating these types of machines, i.e., the non-hauling machines, the operator may need to swing, or swivel, his/her head, and/or torso, in side-to-side motions e.g., left-to-right or vice versa, to monitor various conditions, for example, movements associated with a bucket of an excavator during a load-swing-dump (LSD) cycle, or in coordinating the relative positionings of the bucket vis-à-vis a dump body of a haul truck as the bucket transitions through a sequence of motions in the LSD cycle.

Conventionally known systems typically provide camera-based monitors that are adapted for monitoring the automobile operator's face and eyes, detecting fatigue or distraction only while driving a vehicle. For example, European Patent 3,683,623 discloses a driver monitoring system that receives monitoring information from one or more monitoring systems to determine states of driver fatigue based on the monitoring information received. Not only is this not a non-hauling machine, but if the automobile driver monitoring system detects a fatigued driver while driving the vehicle, it may control one or more vehicle systems based on the driver state.

Hence, there exists a need for a fatigue detection and operator alert system that detects operator fatigue during non-hauling machine operations at a work site to increase operator awareness to maintain and obtain desired machine productivity, as well as reducing fatigue related hazardous behavior for a safer operating environment while increasing productivity.

SUMMARY

In accordance with one aspect of the disclosure, a fatigue detection and operator alert system for a machine having a cab, a seat, and a joystick is disclosed. The fatigue detection and operator alert system comprises: an optic sensor positioned non-obstructively facing an operator and configured to output a first signal consisting of images captured of the operator: a joystick sensor assembly operatively associated with the joystick and including at least one of: a pressure sensor configured to provide a second signal indicative of a pressure of an operator hand on the joystick, and a thermal sensor configured to provide a third signal indicative of a temperature of the operator; and a controller in communication with the optic sensor, and the joystick sensor assembly, the controller configured to: receive the first signal, the second signal, and the third signal; detect instances of operator fatigue in real time based on the first signal, the second signal, and the third signal during non-hauling operation of the machine; and actuate an alert device communicably coupled to the controller, the alert device configured to receive an actuation signal and issue an operator alert when instances of operator fatigue are detected.

In accordance with another aspect of the disclosure, a machine is disclosed comprising: a frame, a prime mover mounted on the frame, a ground engaging element supporting the frame, a working device extending from the frame, a cab, a seat mounted on a floorboard of the cab, a joystick for actuating the working device, and a fatigue detection and operator alert system. The fatigue detection and operator alert system includes: an optic sensor positioned non-obstructively facing an operator and configured to output a first signal consisting of images captured of an operator: a joystick sensor assembly operatively associated with the joystick and including at least one of: a pressure sensor configured to provide a second signal indicative of a pressure of an operator hand on the joystick, and a thermal sensor configured to provide a third signal indicative of a temperature of the operator: a load sensor configured to provide a fourth signal indicative of a load of an operator, a controller in communication with the optic sensor, and the joystick sensor assembly, the controller configured to: receive the first signal, the second signal, third signal, and the fourth signal: detect instances of operator fatigue in real time based on the first signal, the second signal, the third signal, and the fourth signal during non-hauling operation of the machine; and actuate an alert device communicably coupled to the controller, the alert device configured to receive an actuation signal and issue an operator alert when instances of operator fatigue are detected.

In accordance with another aspect of the disclosure, a method for detecting fatigue and alerting an operator in a cab of a machine during non-hauling operation, the method comprising: capturing images of the operator, via an optic sensor, and sending a first signal of the images to a controller in communication with the optic sensor: receiving pressure inputs from the operator, via a pressure sensor on a joystick in the cab, and sending a second signal of pressure inputs to the controller in communication with the pressure sensor: receiving thermal inputs from the operator, via a thermal sensor on the joystick, and sending a third signal of the thermal inputs to the controller in communication with the thermal sensor: receiving weight inputs from the operator, via a load sensor, and sending a fourth signal of the weight inputs to the controller in communication with the load sensor; detecting instances of operator fatigue in real time by processing, via the controller, the first, second, third, and fourth signal received by the controller; and activating an alert device communicably coupled to the controller, the alert device configured to receive an actuation signal and issue an operator alert, via the controller, to alert the operator when instances of operator fatigue are detected.

These and other aspects and features of the present disclosure will be better understood upon reading the following detailed description when read in conjunction with the accompanying drawings.

Figure 1:
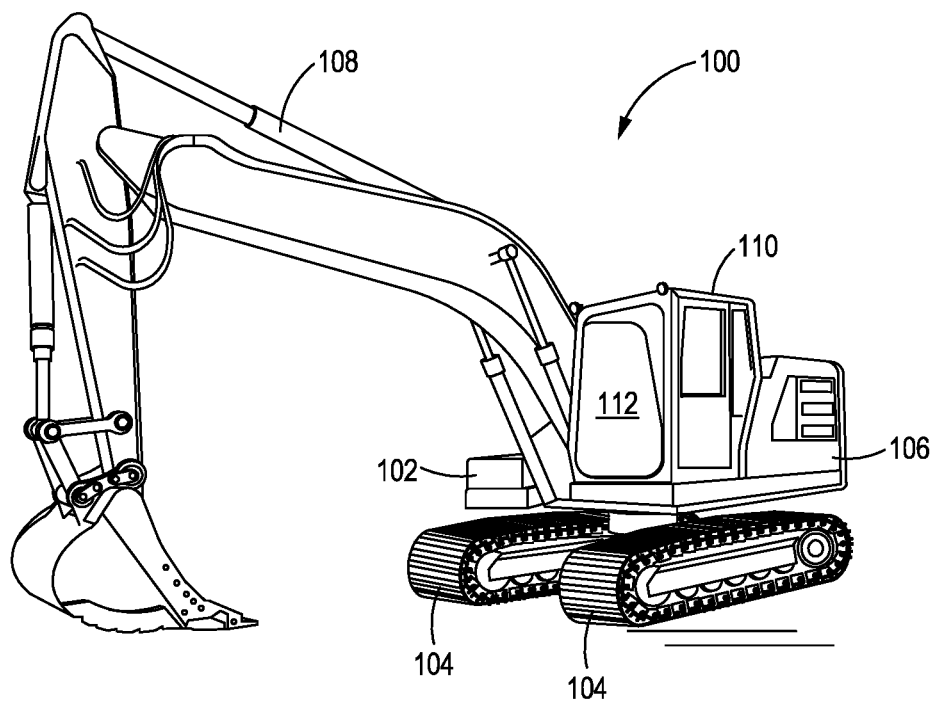
FIG. 1 is a perspective view of a machine, according to an embodiment of the present disclosure.

The figures depict one embodiment of the presented disclosure for purposes of illustration only. One skilled in the art will readily recognize from the following discussion that alternative embodiments of the structures and methods illustrated herein may be employed without departing from the principles described herein.

DETAILED DESCRIPTION

Referring now to the drawings, and with specific reference to the depicted example, a machine 100 is shown, illustrated as an exemplary excavator. Excavators are heavy equipment designed to move earth material from the ground or landscape at a dig site in the construction and agricultural industries. While the following detailed description describes an exemplary aspect in connection with the excavator, it should be appreciated that the description applies equally to the use of the present disclosure in other machines, including, but not limited to, backhoes, front-end loaders, shovels, draglines, skid steers, wheel loaders, and tractors, as well.

Referring now to FIG. 1, the machine 100 comprises a frame 102. The frame 102 is supported on ground engaging elements 104, illustrated as continuous tracks. It should be contemplated that the ground engaging elements 104 may be any other type of ground engaging elements 104 such as, for example, wheels, etc. The machine 100 further includes a prime mover 106 in the frame 102, a work implement 108 extending from the frame 102 for conducting work, such as, for example, excavating landscapes or otherwise moving earth, soil, or other material at a dig site, and a cab 110 for operator personnel to operate the machine 100. The frame 102 may have an upper swiveling body common with excavators and machines in the agricultural and construction industries. The cab 110 may be rotatable on the frame 102 or rotatable via the upper swiveling body common with excavators and other machines in the agricultural and construction industries. The prime mover 106 may be an engine or electric motor, as generally known in the arts.

Figure 2:
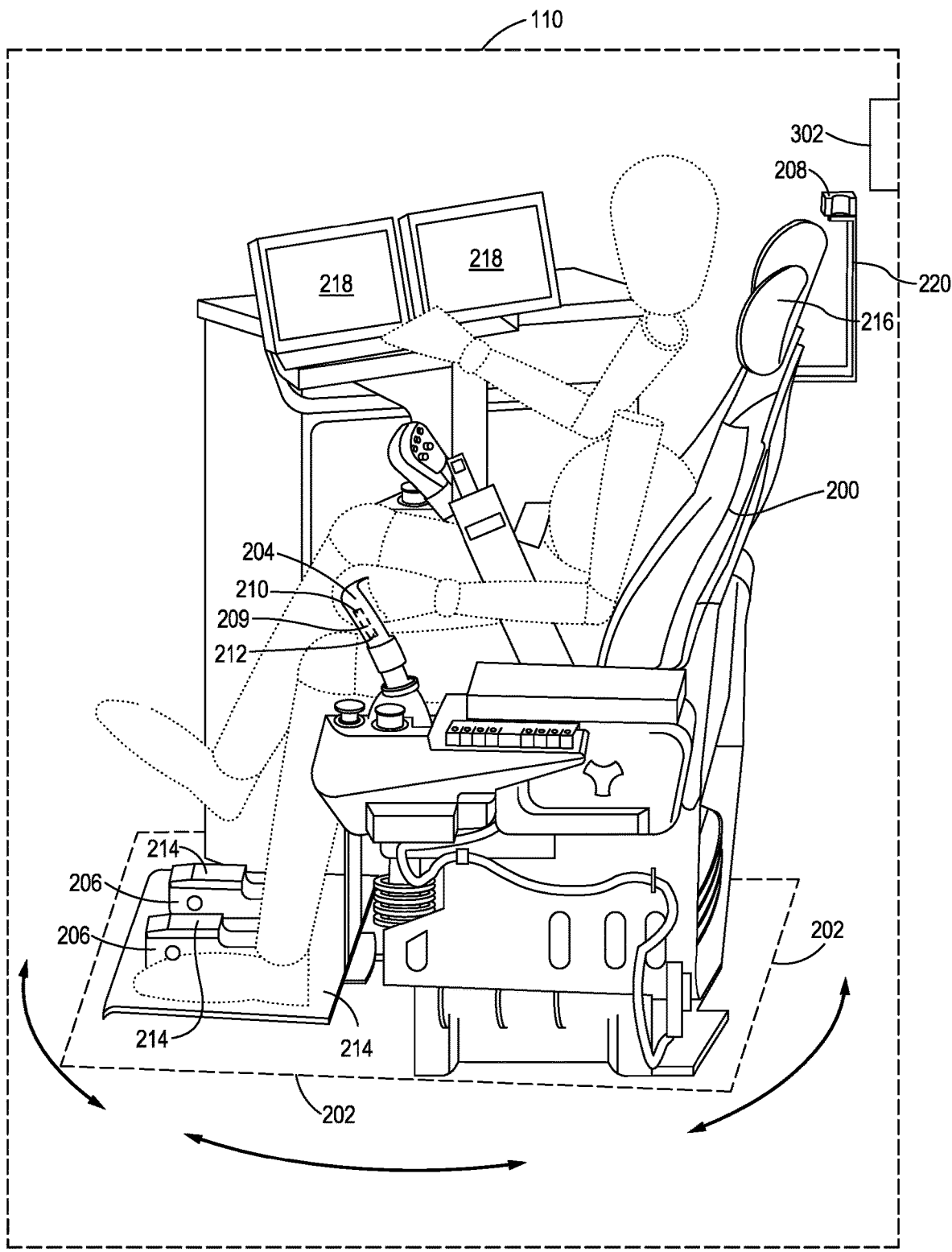
FIG. 2 is a perspective view of the fatigue detection and operator alert system in a cab of the machine of FIG. 1, according to an embodiment of the present disclosure.

Now referring to FIG. 2, a perspective view of the cab 110 of the machine 100 of FIG. 1 is illustrated, according to one embodiment of the disclosure. The cab 110 of the machine 100 further includes a seat 200 mounted on a floorboard 202, an at least one joystick 204, and an at least one foot pedal 206. The machine 100 and cab 110 may have various configurations such as an upper swiveling body on the frame 102 allowing the cab 110 to be rotatable on the frame 102, the seat 200 being configured to be rotatable or fixed, and the floorboard 202 of the cab 110 being configured to be rotatable or fixed (collectively, "Machine Swivel Configurations"), as generally known in the arts. The machine 100, seat 200, cab 110, and/or floorboard 202 may be moving or rotating while the operator moves his or her head for various Machine Swivel Configurations.

The at least one foot pedal 206 may be replaced with a footrest, as generally known in the arts. An at least one optic sensor 208 is positioned above the seat 200 in the cab 110. An at least one thermal sensor 212 and an at least one pressure sensor 210 may be provided in the at least one joystick 204. An at least one load sensor 214 may be provided on the floorboard 202 or in the at least one foot pedal 206. The at least one foot pedal 206 may also be a replaced with a footrest, as generally known in the arts.

The at least one optic sensor 208 may generate a first signal indicative of an operator pose in the cab 110 during non-hauling operation of the machine 100. In its field of view, the at least one optic sensor 208 may be configured to capture poses of the operator seated on the seat 200. The at least one optic sensor 208 may be positioned so that the at least one optic sensor 208 has a field of view of the operator's head in a non-obstructive manner of the operator's vantage point through the window 112 of the cab 110. The window 112 may provide a non-obstructive view for the operator to conduct various non-hauling operations and the window 112 may have a viewing area ranging from 0 to 360 degrees, as generally known in the arts. The at least one optic sensor 208 is positioned in a non-obstructive manner so that it does not interfere with the operator's vision through the viewing area of the window 112 during non-hauling operations. The at least one optic sensor 208 may remain non-obstructively facing the operator to capture operator poses, head movements, and/or head swivels to be processed for a determination of states or instances of operator fatigue during non-hauling machine operations.

The at least one optic sensor 208 may also be positioned on or attached to a headrest 216 on the seat 200 behind the operator's head. The headrest 216 may be adjustable and calibratable for operators of different heights operating the machine 100. A display panel 218 may be provided in the cab 110 that provides a user interface (not shown) and may be utilized by the operator to automatically calibrate the at least one optic sensor 208 to the height of the operator, as generally known in the arts, prior to or during operation of the machine 100. For example, the at least one optic sensor 208 may be positioned on an adjustable bracket 220 that adjusts the height of the at least one optic sensor 208 based on an input by the operator on the display panel 218 that calibrates to the operator's height upon activation of the machine 100. The at least one optic sensor 208 may capture images of head movements from the back of the head that include left, right, up, and down motions of the head and neck of the operator. The at least one optic sensor 208 may capture operator poses on the seat 200 in its field of view in real time including the operator's head pose, shoulder pose, torso movements, head & neck movements that include left, right, up, and down motions (collectively "Operator Head Movements").

The at least one optic sensor 208 may include infrared (IR) sensors, optical cameras, stereo cameras, smart cameras, monocular cameras, wired ethernet cameras with high compute PGA, or smart vision systems having a dedicated processor onboard, including video processing acceleration provided by Field Programmable Gate Array (FPGA), digital signal processor (DSP), general purpose graphics processing unit (GP-GPU), or any other suitable microprocessor with supporting application software, capable of capturing images or real-time videos or an operator in the cab 110 during non-hauling operation of the machine 100.

The at least one joystick 204 may include a joystick sensor assembly 209 including the at least one pressure sensor 210 and the at least one thermal sensor 212, be provided together or separately in the joystick sensor assembly 209, in various embodiments of the disclosure. The at least one pressure sensor 210 may generate a second signal indicative of an operator's pressure input on the at least one joystick 204. The at least one pressure sensor 210 may be configured to determine a pressure input on the at least one joystick 204 from a hand or finger of an operator gripped around the at least one joystick 204. The at least one pressure sensor 210 may be a strain gauge sensor, a piezoelectric sensor, a capacitive pressure sensor, a resistive sensor, a strain gauge sensor, and/or a Hall effect sensor, as generally known in the arts, to detect and measure operator pressure input on the at least one joystick 204 in generating the second signal.

The at least one thermal sensor 212 may generate a third signal indicative of an operator's temperature input on the at least one joystick 204, via the operator's hand or at least one finger. The at least one thermal sensor 212 may be configured to determine or detect a temperature input on the at least one joystick 204 from a hand of the operator gripped around the at least one joystick 204. The at least one thermal sensor 212 may be a thermal sensor such as a thermocouple, a thermistor, a resistance temperature detector, and/or an infrared temperature sensor, as generally known in the arts, used to detect and measure operator temperature input on the at least one joystick 204 in generating the third signal.

The at least one pressure sensor 210 and the at least one thermal sensor 212 may be provided on the at least one joystick 204 as a plurality of touch sensors, as generally known in the arts to receive inputs of pressure or temperature from a hand or finger of an operator. For example, a touch sensor may be provided on a button of the at least one joystick 204 for a finger to press, or provided on a shaft of the at least one joystick 204 for a hand to grip around. The at least one pressure sensor 210 and the at least one thermal sensor 212 may receive binary or variable inputs of pressure and temperature from the hand grip or finger press by an operator on the at least one joystick 204. The at least one joystick 204 may be configured to include sensors that further detects hand sweat, the sweat sensor being included in the joystick sensor assembly 209.

The at least one load sensor 214 may generate a fourth signal indicative of an operator's load exerted on the floorboard 202 or the at least one foot pedal 206. The at least one load sensor 214 may be configured to determine a load exerted on the floorboard 202 or on the at least one foot pedal 206 by the operator or one of operator's feet. The at least one load sensor 214 may include a plurality of load cells, as generally known in the arts. A footrest, as generally known in the arts, may be provided in lieu of the floorboard 202 or the at least one foot pedal 206 and the at least one load sensor 214 may be provided in the footrest. The at least one load sensor 214 may be an electro-mechanical sensor, a load cell sensor, strain gauge load cells, hydraulic load cells, pneumatic load cells, capacitive load cells, piezoelectric load cells, and/or a magnetic load cells, as generally known in the arts, generating a fourth signal when an applied load, weight, or force is measured or detected.

Figure 3:
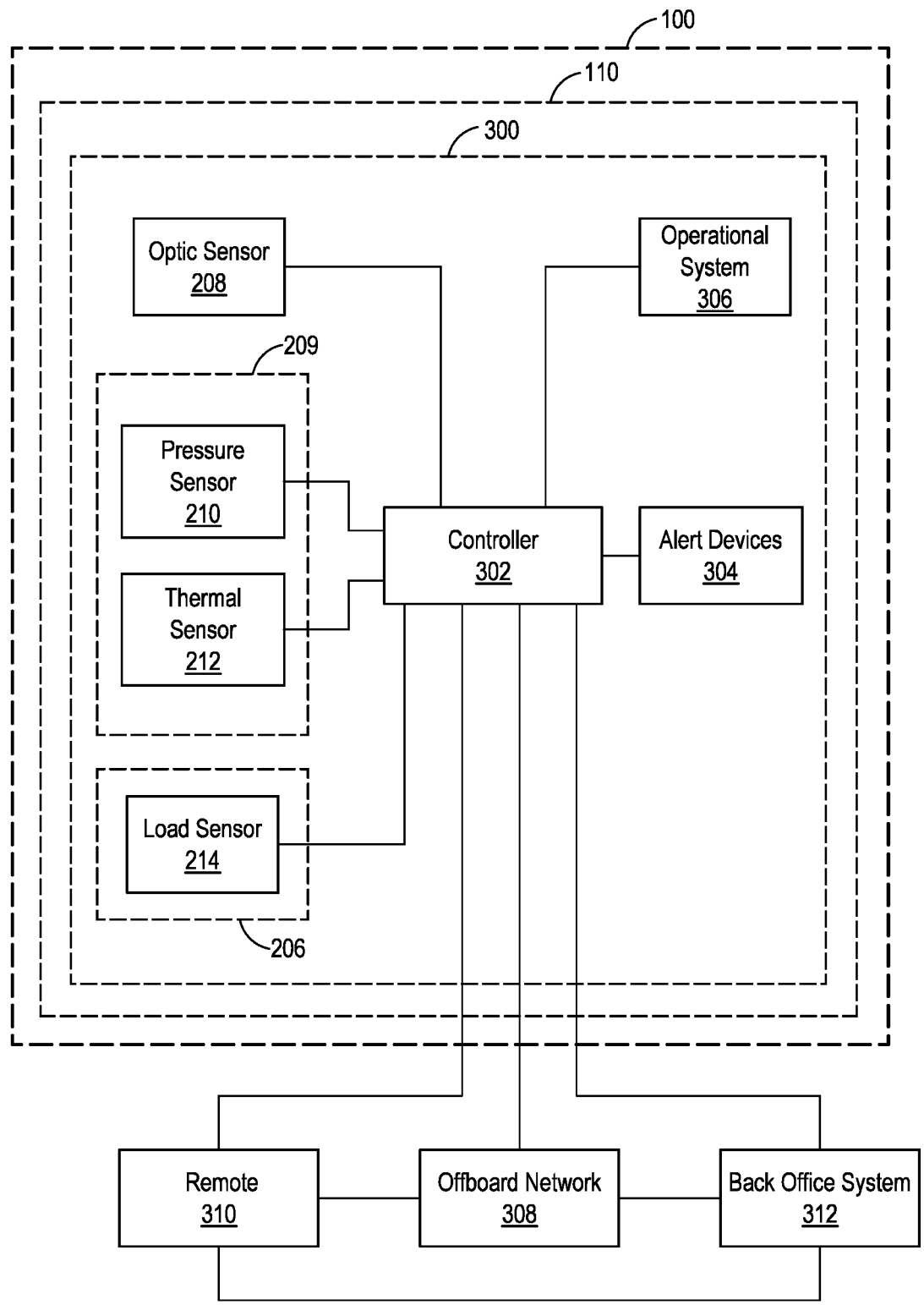
FIG. 3 is a block diagram of the fatigue detection and operator alert system of FIG. 2, according to an embodiment of the present disclosure.

Now referring to FIG. 3, a block diagram of a fatigue detection and operator alert system 300 is illustrated. The fatigue detection and operator alert system 300 detects experiences of operator fatigue during non-hauling operation of the machine 100. For purposes of this disclosure, "fatigue" may be regarded as being inclusive of at least one or more of drowsiness, tiredness, sleepiness, weariness, exhaustion, weakness, lethargic, or a general decrease in awareness or alertness of a person or operator. Non-hauling operations of the machine 100 may include all non-driving operations that various machines may conduct. For example, an operator in an excavator may perform a dig operation or an LSD cycle using an excavator having a cab 110 rotatable on the frame 102, as generally known in the arts. Non-hauling operations of the machine 100 may be actuated by an operator utilizing the at least one joystick 204 for actuating the work implement 108 of the machine 100.

The machine 100 may further comprise a controller 302 in communication with the fatigue detection and operator alert system 300. The controller 302 may control the alert devices 304 and operational systems 306 associated with the machine 100. Alert devices may include an audible alarm, a seat vibration, a visual alarm on the display panel, a lighting sequence alarm, and a back-office system notification of instances of operator fatigue, as generally known in the arts using the operational systems 306 of the machine 100.

The operational systems 306 may be one of many operating systems found within a machine 100 such as an ignition system, a fuel injection system, an oil transport system, a transmission, a throttle system, a power system, a braking system, a cooling system, a navigation system, a lighting system, an alarm system, a communication system, a battery system, and/or an engine or other propulsion system, as generally known in the arts. These systems may also include one or more hydraulic, mechanical, electronic, and software-based components in which the controller 302 may communicate with and control, as generally known in the arts.

The controller 302 may be communicably connected to an off-board network 308, a remote 310 for controlling the machine 100 remotely, and a back-office system 312. The remote 310 may be a computer, laptop, mobile phone, tablet, or the like, that may access the off-board network 308 through a website, URL, app, or the like, as generally known in the arts. The remote 310 may be used to communicate with the controller 302, via the off-board network 308 and/or back-office system 312, to control, activate, or deactivate the operational systems 306 within the machine 100, as well as alerting the operator or a back-office team. The remote 310 may be in communication with the controller 302 from a different location than the machine 100 through a wired or wireless network connection, as generally known in the arts. The back-office team may utilize the remote 310 to control one of the operational systems 306 upon detection of operator fatigue and/or communicate to the operator in the machine 100.

The controller 302 may embody a single microprocessor or multiple microprocessors that include a means for controlling various operations in the machine 100. Numerous commercially available microprocessors can be configured to perform the functions of controller 302. It should be appreciated that the controller 302 could readily be embodied in a general machine microprocessor capable of controlling numerous machine functions. The controller 302 may include a memory, a secondary storage device, a processor, and any other components for running an application as well as storing the collection of data and signals received from the at least one optic sensor 208, at least one pressure sensor 210, at least one thermal sensor 212, and at least one load sensor 214, as well as the operational systems 306. Various other circuits may be associated with the controller 302 such as power supply circuitry, signal conditioning circuitry, solenoid driver circuitry, and other types of circuitry. The controller 302 may be equipped with artificial intelligence and machine learning capabilities, as generally known in the arts, that improves the continuous analysis of an operator for operator fatigue during operation of the machine 100 based on the signals received from the at least one optic sensor 208, at least one pressure sensor 210, at least one thermal sensor 212, and at least one load sensor 214, as well as the operational systems 306. The controller 302 may have AI or machine learning capabilities that can be utilized for head-pose pattern recognition, joystick pattern recognition, handling/operator behavior identification, other non-hauling operation pattern recognitions, guidance support, and for operator-to-operator variability assessment.

The at least one optic sensor 208 may be configured to capture images of the operator head against an initialized foreground or background that comes into the field of view of the at least one optic sensor 208. For example, the foreground imagery through the window 112 may be used for image learning by the controller 302. The controller 302 may utilize AI models having image learning and parsing processing to recognize and interpret visual patterns and features captured by the at least one optic sensor 208. The controller 302 may further utilize machine learning and AI models to recognize and interpret pressure, thermal, and load inputs received by the at least one pressure sensor 210, the at least one thermal sensor 212, and the at least one load sensor 214. The controller 302 may utilize machine learning algorithms to learn and recognize patterns of operator fatigue of the operator through data collection received from the at least one optic sensor 208, the at least one pressure sensor 210, the at least one thermal sensor 212, and the at least one load sensor 214, preprocessing, feature extraction, training data preparation, model training, model evaluation, pattern recognition, and feedback & iteration processes to adapt and improve pattern recognition for accurate detections of instances of operator fatigue based on the captured images.

The controller 302 in the machine 100 may control the alert devices 304 associated with the machine 100 to alert and/or awaken the operator. The alert devices 304 in the machine 100 include activating an audible alarm, a visual alarm, a horn, a light sequence, and/or visualizations on the display panel 218. The alert devices 304 may also include alerting a back-office team by sending an alert signal to the back-office system 312. The back-office team may subsequently contact the operator using the remote 310 and/or back-office system 312.

The controller 302 in the machine 100 may also control the operational systems 306 associated with the machine 100. The operational systems 306 may be one of many operating systems found within a machine 100 such as an ignition system, a fuel injection system, an oil transport system, a transmission, a throttle system, a power system, a braking system, a cooling system, a navigation system, a lighting system, an alarm system, a battery system, and/or an engine or other propulsion system, as generally known in the arts. These systems may also include one or more hydraulic, mechanical, electronic, and software-based components in which the controller 302 may communicate with and control, as generally known in the arts. The remote 310 may be used to communicate with the controller 302, via the off-board network 308, to control, activate, or deactivate the operational systems 306 within the machine 100, as generally known in the arts.

The controller 302 receives the first signal from at least one optic sensor 208 indicative of an operator pose in the cab 110 during non-hauling operation of the machine 100. The controller 302 may process the captured operator poses on the seat 200 in its field of view in real time for all Operator Head Movements and determine whether a state and instance of operator fatigue is occurring based on the captured operator poses during non-hauling operation of the machine 100. For example, the operator's head tilted forward or to a side, such as in a case where the operator has fainted, passed out, lost consciousness, fallen asleep, or is falling asleep, may be captured by the at least one optic sensor 208 and processed by the controller 302 as a determination of operator fatigue.

The at least one optic sensor 208 may capture images of head swivels that include left, right, up, and down movements of the head and neck of the operator to determine operator fatigue. The at least one optic sensor 208 may capture images in real time of Operator Head Movements without obstructing the operator's view out the window 112. The at least one optic sensor 208 may capture images of head swivels that include left, right, up, and down movements of the head, neck, and torso of the operator. As the head of the operator moves or swivels left, right, up, and/or down as well as tilting forward, backwards, left side, or right side, the at least one optic sensor 208 may detect states and instances of operator fatigue of various operator poses in the various Machine Swivel Configurations. The controller 302 can determine operator fatigue from images captured of all the Operator Head Movements relative to the seat 200 being fixed or rotatable, the floorboard 202 being fixed or rotatable, the cab 110 being fixed or rotatable on the frame 102, and/or the frame 102 having an upper swiveling body for various machine type configurations. For example, while an operator is conducting an LSD cycle on an excavator the at least one optic sensor 208 may detect instances of operator fatigue during the multirotational movements of the cab 110 rotating on an upper swiveling body on the frame 102 and/or the seat 200 remaining fixed or rotatable.

The controller 302 may also receive the second signal from at least one pressure sensor 210 indicative of an operator's hand grip or finger sensations on the at least one joystick 204 in the cab 110 during non-hauling operation of the machine 100. The controller 302 may process the pressure input on the at least one joystick 204 from a hand or finger of an operator contacting, gripping, or otherwise actuating the at least one joystick 204.

The controller 302 receives the third signal from at least one thermal sensor 212 indicative of an operator's hand grip or finger sensations on the at least one joystick 204 in the cab 110 during non-hauling operation of the machine 100. The controller 302 may process temperature inputs on the at least one joystick 204 from a hand or finger of the operator contacting, gripping, or otherwise actuating the at least one joystick 204. The machine 100 is often operated at work sites where the temperatures settings within the cab 110 is much lower than normal body temperature of a human operator. The at least one thermal sensor 212 may easily detect an increase in temperature applied to the at least one joystick 204 when an operator touches the at least one joystick 204 with his or her hand or finger. The controller 302 may collectively receive the second and third signals from the joystick sensor assembly 209 which may include at least one of the at least one pressure sensor 210 and the at least one thermal sensor 212, or a combination of both. In instances where an operator is wearing a glove over his or her hand, the joystick sensor assembly 209 may include both the at least one of the at least one pressure sensor 210 and the at least one thermal sensor 212.

The controller 302 receives the fourth signal from the at least one load sensor 214 indicative of a load or weight exerted and/or released on the floorboard 202 or an at least one foot pedal 206 during non-hauling operation of the machine 100. The controller 302 may process load or weight thresholds exerted on the floorboard 202 or on the at least one foot pedal 206 by the operator or one of operator's feet.

The controller 302 may receive the first signal, second signal, third signal, and fourth signal in real time from the at least one optic sensor 208, at least one pressure sensor 210, at least one thermal sensor 212, and at least one load sensor 214, respectively. Based on the received signals, the controller 302 may process the signals to determine whether an instance of operator fatigue has occurred or is occurring. The controller 302 may also predict whether an operator is prone to experience fatigue by utilizing machine learning features in the controller 302, as generally known in the arts. The machine learning in the controller 302 may be continuously applied to specific individual operators for improving the predictability of operator fatigue experiences based on the real time signals received from the at least one optic sensor 208, at least one pressure sensor 210, at least one thermal sensor 212, and at least one load sensor 214.

Figure 4:
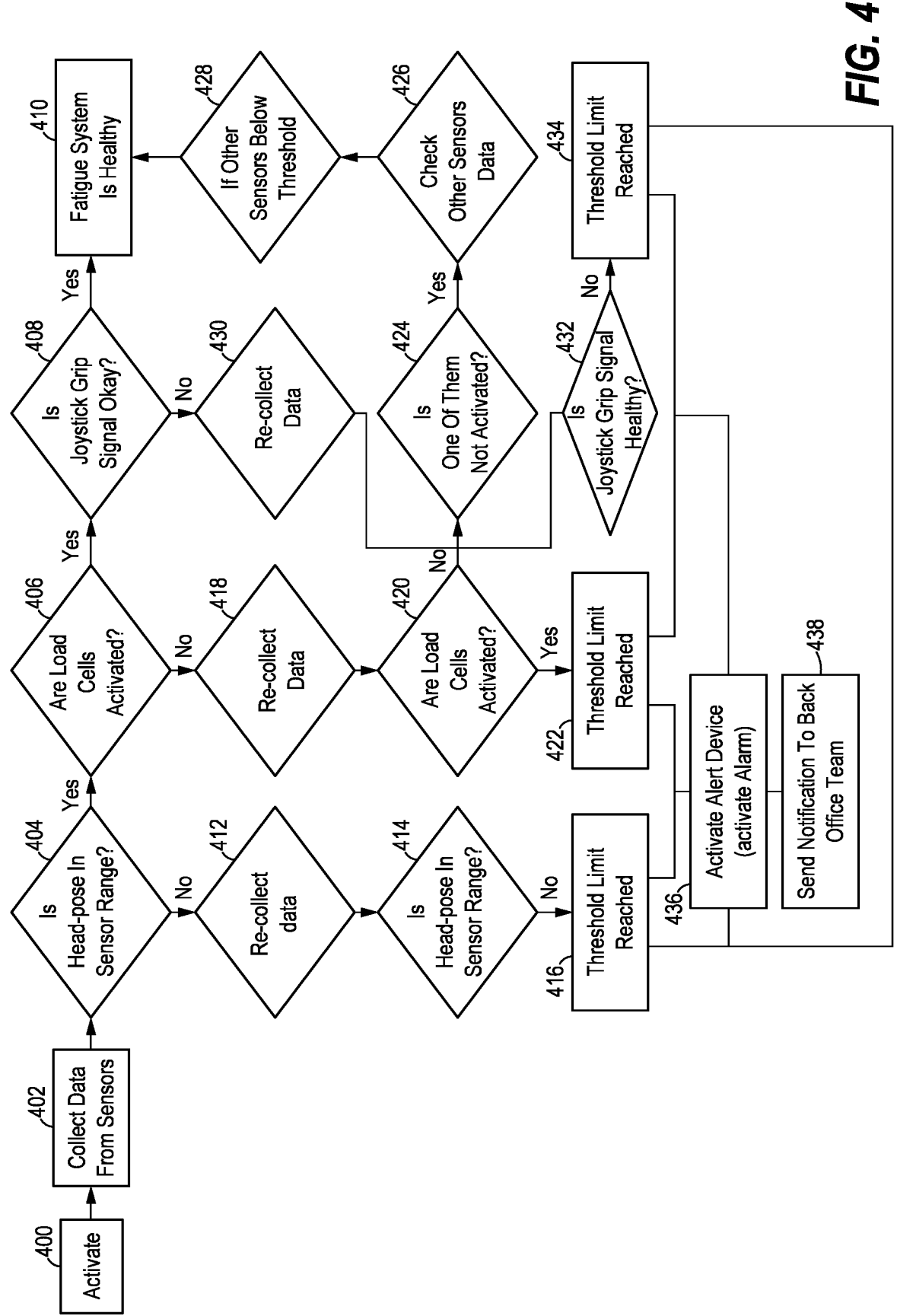
FIG. 4 is a flow-chart of an operation of the fatigue detection and operator alert system of FIG. 3, according to an embodiment of the present disclosure.

Now referring to FIG. 4, an operation of the fatigue detection and operator alert system 300 is illustrated as a flow chart, according to one embodiment of the disclosure. In operation 400, the fatigue detection and operator alert system 300 is activated upon the activation of the machine 100, upon activation of operating a non-hauling operation of the machine 100, or upon activation of the work implement 108. The display panel 218 may require an input from the operator in which the fatigue detection and operator alert system 300 is activated and calibrated to the operator's height by adjusting the height of the headrest 216 and/or upload prior operator data stored in memory in the controller 302. Once activated, in operation 402, the controller 302 collects data from the signals received from the at least one optic sensor 208, the at least one pressure sensor 210, at least one thermal sensor 212, and at least one load sensor 214.

In operation 404, the at least one optic sensor 208 communicates to the controller 302 whether a head pose of the operator's head lies within a head-pose range in the field of vison of the at least one optic sensor 208. In operation 406, the at least one load sensor 214 communicates to the controller 302 an activated status when a weighted load from the weight of the operator's foot is detected on the at least one load sensor 214 on the floorboard 202 or the at least one foot pedal 206. In operation 408, the joystick sensor assembly 209 communicates signals from the at least one pressure sensor 210 and/or the at least one thermal sensor 212 of a joystick grip signal.

In an operation 410, if each of the at least one optic sensor 208 indicates the operator's head is in head-pose range, that the at least one load sensor 214 has been activated indicating the weight of the operator, and that the joystick sensor assembly 209 indicates a joystick grip-signal, then the fatigue detection and operator alert system 300 may remain in a "healthy" status demonstrating that the operator does not show an indication of operator fatigue during non-hauling operation of the machine 100. In operation 410, the controller 302 does not activate an alert devices 304 when the fatigue detection and operator alert system 300 is in a healthy status.

In an operation 412, if the at least one optic sensor 208 does not detect a head-pose within the head-pose range, then the at least one optic sensor 208 will continue to capture images of the operator's head pose. In an operation 414, the at least one optic sensor 208 communicates signals whether the head pose of the operator is within the head pose range. In an operation 416, the controller 302 processes whether an out-of-range threshold limit has been reached for the head-pose being out of range and outside the head-pose range of the at least one optic sensor 208. The at least one optic sensor 208 may be configured to determine the varying degrees of head tilts in various head poses of the operator in various body poses to determine instances of operator fatigue. Head tilts include forward, backward, or side tilts of the operator's head. The operator's head pose may be considered out-of-range of the head-pose range and may potentially trigger one of the alert devices 304 based on the duration of time that the head pose is considered out-of-range by the at least one optic sensor 208.

Continuing from operation 406, in an operation 418, if the at least one load sensor 214 does not detect a load or weight on the floorboard 202 or on the at least one foot pedal 206, then the at least one load sensor 214 will continue to detect for a load or weight from an at least one operator foot to be exerted on the at least one load sensor 214. In an operation 420, the at least one load sensor 214 communicates signals whether a load from the operator has been detected by the at least one load sensor 214. In an operation 422, the controller 302 processes the signals from the at least one load sensor 214 that a load threshold limit has been activated by the load exerted from an operator's foot on the floorboard 202 or the at least one foot pedal 206. The at least one load sensor 214 may have a plurality of load cell sensors that can detect varying thresholds of loads exerted on a surface in which the at least one load sensor 214 is incorporated, such as the floorboard 202 or the at least one foot pedal 206.

In an operation 424, the controller 302 processes the signals from the at least one load sensor 214 that a load threshold limit has not been activated. In an operation 426, the fatigue detection and operator alert system 300 will check for the remaining signals from the at least one optic sensor 208 and the joystick sensor assembly 209. In an operation 428, the controller 302 checks, via processing, if the remaining signals from the at least one optic sensor 208 and the joystick sensor assembly 209 are also below sensor thresholds such as the head-pose range, pressure, and temperature thresholds. If the head-pose is not within the head-pose sensor range of the at least one optic sensor 208, the load threshold of the at least one load sensor 214 has not been activated, and the joystick grip signal of the joystick sensor assembly 209 is not activated, then the fatigue detection and operator alert system 300 is in a healthy status and the operator has not shown states or instances of operator fatigue at a level necessary to trigger the alert devices 304 to alert or awaken the operator.

Continuing from operation 408, in an operation 430, if the joystick sensor assembly 209 does not detect a pressure or temperature sensory from the hand or finger of the operator on the at least one joystick 204, then the joystick sensor assembly 209 will continue to detect for an operator's grip or finger touch on the at least one joystick 204. In an operation 432, the joystick sensor assembly 209 communicates signals whether a pressure or temperature sensory from the hand or finger of the operator has been exerted on the at least one joystick 204. In an operation 434, the controller 302 processes whether an out-of-range threshold limit has been reached for the at least one pressure sensor 210 and/or the at least one thermal sensor 212 of the joystick sensor assembly 209. The joystick sensor assembly 209 may be configured to determine varying degrees of pressure and/or temperature of the operator's hand to determine instances of operator fatigue.

The fatigue detection and operator alert system 300 may be configured to activate one of the alert devices 304 when the controller 302 determines an unhealthy status of the fatigue detection and operator alert system 300. An unhealth status may be determined by the controller 302 when at least two sensors indicate signals that two threshold limits have been reached, as described in operations 416, 422, and 434 for the signals received regarding the head-pose range from the at least one optic sensor 208, the load threshold from the at least one load sensor 214, and the joystick grip signal from the joystick sensor assembly 209. In operation 436, one of the alert devices 304 is activated by the controller 302 when two sensors reach a threshold limit, as described in operations 416, 422, and 434. When one of the alert devices 304 is activated in operation 436, an alert notification is sent to the back-office system 312 by the controller 302 to alert a back-office team, in a step 438, and/or retain data on the specific operator during non-hauling operation of the machine 100.

The fatigue detection and operator alert system 300 may detect operator fatigue in each of the Machine Swivel Configurations of the machine 100, cab 110, seat 200, and floorboard 202. For example, the operator may be conducting a dig operating in an excavator performing LSD cycles using the work implement 108 of the excavator. In one example, an LSD cycle may refer to the operator actuating the work implement 108 using the at least one joystick 204 to dig earth at a work site into a bucket, the operator then swings the frame 102 which is an upper swiveling body away from the dig site using the at least one joystick 204 or the or at least one foot pedal 206, and dumping the earth using the at least one joystick 204 or at least one foot pedal 206 in a new location, as generally known in the arts.

During non-hauling operation, the operator may rotate his or her head to conduct the dig operation, or other operation for various non-hauling machines. The fatigue detection and operator alert system 300 may distinguish the operator's head movements necessary for dig operations and other non-hauling operations in the machine 100 from head poses that indicate instances of operator fatigue such as a forward head tilt indicating sleepiness of the operator, and the like. Furthermore, the fatigue detection and operator alert system 300 may detect states and instances of operator fatigue when the operator makes various head movements relative to the rotation of the seat 200, the rotation of the floorboard 202, the rotation of the cab 110, and the rotation of the frame 102 in all Machine Swivel Configurations. The controller 302 is configured to process the captured images of Operator Head Movements received from the at least one optic sensor 208 for detecting instances of operator fatigue when the Operator Head Movements occur relative to at least one of: the seat 200 fixed in the cab 110, the cab 110 fixed on the frame 102 of the machine 100, movements by the seat 200 rotatable in the cab 110, movements by the floorboard 202 rotatable in the cab 110, movements by the cab 110 rotatable on the frame 102, and movements by the upper swiveling body on the machine 100.

INDUSTRIAL APPLICABILITY

In operation, the present disclosure may find applicability in many industries including, but not limited to, the automotive, construction, earth-moving, mining, and agricultural industries. Specifically, the systems, machines, and methods of the present disclosure may be used for detecting operator fatigue during non-hauling operation of machines including, but not limited to, excavators, backhoes, rope shovels, skid steers, wheel loaders, tractors, and similar machines with non-hauling operations for various operator movements relative to movements of machine components. While the foregoing detailed description is made with specific reference to excavators, it is to be understood that its teachings may also be applied onto the other machines such as draglines, skid steers, rope shovels, wheel loaders, and the like. The fatigue detection and operator alert system 300 may be provided as a retrofit onto these other applications that require an operator for operation of machine work implements.

Figure 5:
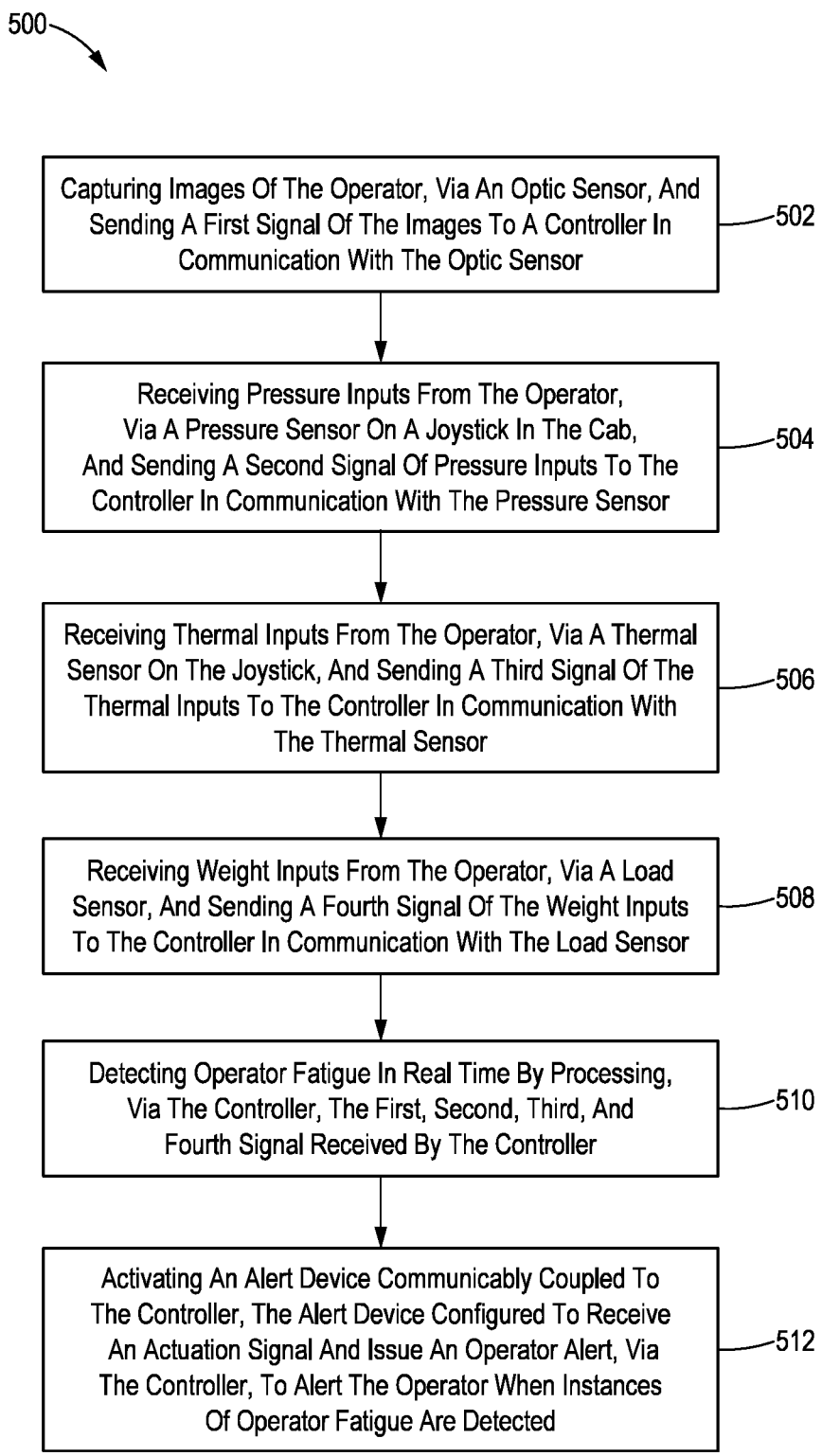
FIG. 5 is a flow-chart of a method of detecting operator fatigue and alerting an operator in the machine of FIG. 1 and alerting the operator, according to an embodiment of the present disclosure.

Now referring to FIG. 5, a method for detecting operator fatigue and alerting an operator 500 in the machine 100 of FIG. 1 during non-hauling operation is illustrated, according to one embodiment of the disclosure. The fatigue detection and operator alert system 300 begins a non-intrusive monitoring of the operator for operator fatigue while the operator is present on the seat 200 during non-hauling operation of the machine 100. The fatigue detection and operator alert system 300 monitors for instances of operator fatigue by: (1) in a step 502, capturing images of the operator, via the at least one optic sensor 208 in communication with the controller 302, and sending a first signal of the images to the controller 302; (2) in a step 504, receiving pressure inputs from the operator, via the at least one pressure sensor 210 in communication with the controller 302, and sending a second signal of the pressure inputs to the controller 302: (3) in a step 506, receiving thermal inputs from the operator, via the at least one thermal sensor 212 in communication with the controller 302, and sending a third signal of the thermal inputs to the controller 302; and (4) in a step 508, receiving load inputs from the operator, via the at least one load sensor 214 in communication with the controller 302, and sending a fourth signal of the load inputs to the controller 302.

In a step 510, the controller 302 processes the received first signal, the second signal, the third signal, and the fourth signal to detect for operator fatigue in real time. Real time includes various scan cycle times that may be chosen or selected for operation in the fatigue detection and operator alert system 300 and processed by the controller 302 for the duration of the non-hauling operation by the operator in the cab 110, such as scan cycle times of 2, 5, 10, 20, and/or 60 seconds.

In a step 512, the controller 302 activates the alert devices 304 when instances of operator fatigue have been detected based on the received first signal, the second signal, the third signal, and the fourth signal processed by the controller 302. The alert devices 304 are communicably coupled to the controller 302 and are configured to receive an actuation signal and issue an operator alert, via the controller, to alert the operator when instances of operator fatigue are detected during non-hauling machine operation.

The detection of operator fatigue is conducted in a non-intrusive manner where nothing is attached to the body of the operator. The fatigue detection and operator alert system 300 may detect fatigue trends that include improper joystick behavior, underlying disease issues, and alcohol. The fatigue detection and operator alert system 300 may also detect instances when the operator is alert or awake demonstrating operator non-fatigue events to avoid false triggers of the alert devices 304 by the controller 302. Non-fatigue events may include machine actuations by the operator, actuations of the joystick, an LSD cycle, a start/stop operations selection, a display panel interface selection, and similar actions an operator may make while alert and awake in the cab 110.

From the foregoing, it can be seen that the technology disclosed herein has industrial applicability in a variety of settings such as, but not limited to agricultural, construction, and mining industries that utilize machines such as excavators, backhoes, rope shovels, skid steers, wheel loaders, tractors, and similar machines having work implements for non-hauling operations.

What is claimed is:

1. A fatigue detection and operator alert system for a machine having a cab, a seat, and a joystick, comprising:
    an optic sensor positioned non-obstructively facing an operator without interfering with a viewing area of the operator, and the optic sensor is configured to output a first signal consisting of images captured of the operator;
    a joystick sensor assembly operatively associated with the joystick and including: a pressure sensor configured to provide a second signal indicative of a pressure of an operator hand on the joystick, and a thermal sensor configured to provide a third signal indicative of a temperature of the operator; and
    a controller in communication with the optic sensor and the joystick sensor assembly, the controller configured to:
        receive the first signal, the second signal, and the third signal;
        detect instances of operator fatigue in real time based on the first signal, the second signal, and the third signal during non-hauling operation of the machine; and
        actuate an alert device communicably coupled to the controller, the alert device configured to receive an actuation signal and issue an operator alert when instances of operator fatigue are detected.

2. The fatigue detection and operator alert system of claim 1, further comprising a load sensor configured to provide a fourth signal indicative of a weight of an at least one operator foot, the controller configured to receive the fourth signal.

3. The fatigue detection and operator alert system of claim 2, wherein:
    the first signal received by the controller from the optic sensor includes images captured of operator head movements;
    the second signal received by the controller from the pressure sensor includes a grip pressure of the operator hand or fingers;
    the third signal received by the controller from the thermal sensor includes the temperature associated with a hand or at least one finger on the hand of the operator; and
    the fourth signal received by the controller from the load sensor includes a measurement of weight of the operator on the load sensor.

4. The fatigue detection and operator alert system of claim 3, the controller is disposed in communication an off-board network, and a back-office system, wherein the alert device includes at least one of:
    an audible alarm;
    a seat vibration;
    a visual alarm on a display panel;
    a lighting alarm; and
    a back-office system notification of instances of operator fatigue.

5. The fatigue detection and operator alert system of claim 3, wherein:
    the optic sensor is at least one of an infrared sensor, an optical camera, a stereo camera, a smart camera, a monocular camera, a wired ethernet cameras with high compute PGA, and a smart vision system;
    the pressure sensor is at least one of a strain gauge sensor, a piezoelectric sensor, a capacitive pressure sensor, a resistive sensor, and a Hall effect sensor;
    the thermal sensor is at least one of a thermocouple, a thermistor, a resistance temperature detector, and an infrared temperature sensor; and
    the load sensor is at least one of an electro-mechanical sensor, a load cell sensor, strain gauge load cells, hydraulic load cells, pneumatic load cells, capacitive load cells, piezoelectric load cells, and a magnetic load cells.

6. The fatigue detection and operator alert system of claim 5, wherein the controller is configured to process the images captured of operator head movements received from the optic sensor to detect instances of operator fatigue when operator head movements occur relative to at least one of:
    the seat fixed in the cab;
    the cab fixed on a frame of the machine;
    movements by a rotatable seat in the cab;
    movements by a rotatable floorboard in the cab;
    movements by a rotatable cab on the frame of the machine; and
    movements by an upper swiveling body on the machine.

7. The fatigue detection and operator alert system of claim 6, wherein the controller is configured with a machine learning and pattern recognition model to detect instances of operator fatigue by interpreting patterns and features based on the received first, second, third, and fourth signals.

8. The fatigue detection and operator alert system of claim 7, wherein the joystick sensor assembly receives touch and grip inputs from the operator including:
    a finger pressure;
    a hand grip pressure;
    a finger temperature;
    a hand temperature;
    a joystick button actuation; and
    a joystick movement.

9. A machine comprising:
    a frame;
    one or more prime movers mounted on the frame;
    a work implement moveably mounted on the frame and operatively driven by at least one of the one or more prime movers;
    a cab;
    a seat mounted on a floorboard of the cab;
    a joystick for actuating the work implement;
    a fatigue detection and operator alert system including:

an optic sensor positioned behind an operator and non-obstructively facing the operator without interfering with a viewing area, and the optic sensor is configured to output a first signal consisting of images captured of the operator;

a joystick sensor assembly operatively associated with the joystick and including: a pressure sensor configured to provide a second signal indicative of a pressure of an operator hand on the joystick, and a thermal sensor configured to provide a third signal indicative of a temperature of the operator;

a load sensor configured to provide a fourth signal indicative of a weight of the operator;

a controller in communication with the optic sensor, the joystick sensor assembly, and the load sensor, the controller configured to:
  receive the first signal, the second signal, the third signal, and the fourth signal;
  detect instances of operator fatigue in real time based on the first signal, the second signal, the third signal and the fourth signal during non-hauling operation of the machine; and
  actuate an alert device communicably coupled to the controller, the alert device configured to receive an actuation signal and issue an operator alert when instances of operator fatigue are detected.

10. The machine of claim 9, wherein:
the first signal received by the controller from the optic sensor includes images captured of operator head movements;
the second signal received by the controller from the pressure sensor includes a grip pressure of the operator hand or fingers;
the third signal received by the controller from the thermal sensor includes the temperature associated with a hand or at least one finger on the hand of the operator; and
the fourth signal received by the controller from the load sensor includes a measurement of weight of the operator on the load sensor.

11. The machine of claim 10, the controller is disposed in communication with an off-board network, a remote, and a back-office system.

12. The machine of claim 11, wherein the alert device includes at least one of:
an audible alarm;
a seat vibrator;
a visual alarm on a display panel;
a lighting alarm; and
a back-office system notification of instances of operator fatigue.

13. The machine of claim 12, wherein the controller is configured to process the images captured of operator head movements received from the optic sensor to detect instances of operator fatigue when operator head movements occur relative to at least one of:
the seat fixed in the cab;
the cab fixed on the frame of the machine;
movements by a rotatable seat in the cab;
movements by a rotatable floorboard in the cab;
movements by a rotatable cab on the frame of the machine; and
movements by an upper swiveling body on the machine.

14. The machine of claim 12, wherein the optic sensor is positioned on one of the seat, a headset on the seat, an adjustable bracket on the headset, and a top portion of the seat.

15. The machine of claim 14, wherein:
the optic sensor is at least one of an infrared sensor, an optical camera, a stereo camera, a smart camera, a monocular camera, a wired ethernet cameras with high compute PGA, and a smart vision system;
the pressure sensor is at least one of a strain gauge sensor, a piezoelectric sensor, a capacitive pressure sensor, a resistive sensor, and a Hall effect sensor;
the thermal sensor is at least one of a thermocouple, a thermistor, a resistance temperature detector, and an infrared temperature sensor; and
the load sensor is at least one of an electro-mechanical sensor, a load cell sensor, strain gauge load cells, hydraulic load cells, pneumatic load cells, capacitive load cells, piezoelectric load cells, and a magnetic load cells.

16. The machine of claim 15, wherein the controller is configured with a machine learning and pattern recognition model to detect instances of operator fatigue by interpreting patterns and features based on the received first, second, third, and fourth signals.

17. A method for detecting fatigue and alerting an operator in a cab of a machine during non-hauling operation, the method comprising:
positioning an optic sensor behind the operator's head non-obstructively facing the operator in the cab, wherein the first signal received by the controller from the optic sensor includes captured images of operator head movements;
capturing images of the operator, via an optic sensor, and sending a first signal of the images to a controller in communication with the optic sensor;
receiving pressure inputs from the operator, via a pressure sensor on a joystick in the cab, and sending a second signal of pressure inputs to the controller in communication with the pressure sensor;
receiving thermal inputs from the operator, via a thermal sensor on the joystick, and sending a third signal of thermal inputs to the controller in communication with the thermal sensor;
receiving weight inputs from the operator, via a load sensor, and sending a fourth signal of weight inputs to the controller in communication with the load sensor;
detecting instances of operator fatigue in real time by processing, via the controller, the first, second, third, and fourth signals received by the controller; and
activating an alert device communicably coupled to the controller, the alert device configured to receive an actuation signal and issue an operator alert, via the controller, to alert the operator when instances of operator fatigue are detected.

18. The method of claim 17, further comprising:
providing the pressure sensor in the joystick, wherein the second signal received by the controller from the pressure sensor includes a grip pressure of an operator's hand or fingers;
providing the thermal sensor in the joystick, wherein the third signal received by the controller from the thermal sensor includes a hand temperature of the operator's hand or fingers;
providing the load sensor on a floorboard of the cab, wherein the fourth signal received by the controller from the load sensor includes a load exerted on the load sensor from the operator; and activating, via the controller, the alert device when at least two of the first, second, third, and fourth signals received by the controller indicate a detected instance of operator fatigue.

19. The method of claim 18, further comprising processing the captured images of operator head movements received by the controller from the optic sensor to detect instances of operator fatigue when operator head movements occur relative to at least one of:
- the seat fixed in the cab;
- the cab fixed on a frame of the machine;
- movements by a rotatable seat in the cab;
- movements by a rotatable floorboard in the cab;
- movements by a rotatable cab on the frame of the machine; and
- movements by an upper swiveling body on the machine.

20. The method of claim 19, further comprising:
recognizing and detecting instances of operator fatigue, via the controller configured with a machine learning and pattern recognition model, by interpreting patterns and features based on the received first, second, third, and fourth signals received by the controller.

* * * * *